United States Patent Office 3,757,012
Patented Sept. 4, 1973

3,757,012
7-[D-(α-AMINO-α-PHENYLACETAMIDO] - 3 - (3-METHYL - 1,2,4 - THIADIAZOL - 5-YLTHIOMETHYL)-3-CEPHEM - 4-CARBOXYLIC ACID AND SALTS THEREOF
Leonard Bruce Crast, Jr., Clay, N.Y., assignor to Bristol-Myers Company, New York, N.Y.
No Drawing. Filed Sept. 14, 1970, Ser. No. 72,172
Int. Cl. C07d 99/24
U.S. Cl. 260—243 C                                7 Claims

ABSTRACT OF THE DISCLOSURE

7-[D-(α-amino - α - phenylacetamido)]-3-(3-methyl-1,2,4 - thiadiazol - 5 - ylthiomethyl) - 3 - cephem - 4-carboxylic acid and its nontoxic, pharmaceutically acceptable salts are valuable as antibacterial agents, as nutritional supplements in animal feeds and as therapeutic agents in poultry and animals, including man, and are especially useful in the treatment, particularly by oral administration, of infectious diseases caused by many Gram-positive and Gram-negative bacteria.

BACKGROUND OF THE INVENTION (1) Field of the invention.—The cephalosporins of the present invention possess the usual attributes of such compounds and are particularly useful in the treatment of bacterial infections by oral administration.

(2) Description of the prior art.—Cephalothin and cephaloridine are well-known antibacterial agents; see U.S. Pats. 3,218,318; 3,449,338 and 3,498,979. The literature also contains considerable data on the activity of cephaloglycin and cephalexin; see U.S. Pats. 3,303,193 and 3,507,861 and Great Britain 985,747 and 1,054,806. Newer cephalosporins include cefazolin and cephapirin; see U.S. Pat. 3,516,997 [and also Netherlands 68/05179 (Farmdoc 34,328) and South Africa 68/4,513] and U.S. Pat. 3,422,100.

The literature on cephalosporins has been reviewed by E. P. Abraham, Quart, Rev. (London) 21, 231 (1967), by E. Van Heyningen, Advan. Drug Res., 4, 1–70 (1967), and briefly in Annual Reports in Medicinal Chemistry, Academic Press, Inc., 111 Fifth Avenue, New York, N.Y. 10003, by L. C. Cheney on pages 96 and 97 (1967) and by K. Gerzon and R. B. Morin on pages 90–93 (1968). New cephalosporins are frequently reported at the annual Interscience Conference on Antimicrobial Agents and Chemotherapy as illustrated by Sassiver et al., Antimicrobial Agents and Chemotherapy—1968, American Society for Microbiology, Bethesda, Md., pages 101–114 (1969), and by Nishida et al., ibid, 236–243 (1970).

The preparation of various 7-[α-amino-arylacetamido]-cephalosporanic acids and the corresponding desacetoxy compounds in which aryl represents unsubstituted or substituted phenyl or 2- or 3-thienyl is described, for example, in British specifications 985,747, 1,017,624, 1,054,-806 and 1,123,333, in Belgian Pat. 696,026 (Farmdoc No. 29,494), in U.S. Pats. 3,311,621, 3,352,858, 3,489,750, 3,489,751, 3,489,752 and 3,518,260, in Japanese Pat. 16,871/66 (Farmdoc 23,231), by Spencer et al., J. Med. Chem., 9 (5), 746–750 (1966), and by Kurita et al., J. Antibiotics (Tokyo) (A) 19, 243–249 (1966), and see also U.S. Pat. 3,485,819.

Netherlands Pats. 68/11676 (Farmdoc 36,349) and 68/12382 (Farmdoc 36,496) and U.S. Pats. 3,489,750 and 3,489,751 disclose ring-substituted cephaloglycins.

Various 7 - [α-aminoarylacetamido]cephalosporins in which one hydrogen of the α-amino group is replaced by a carbonyl group which is attached in turn to another moiety have been reported. The earliest were the cephaloglycin and cephalexin precursors in which use was made of a common peptide blocking group such as carbobenzyloxy as illustrated by U.S. Pat. 3,364,212, Belgian Pat. 675,298 (Farmdoc 22,206), South African Pat. 67/1,260 (Farmdoc 28,654) and Belgian Pat. 696,-026 (Farmdoc 29,494). Related compounds include those of U.S. Pats. 3,303,193 and 3,311,621 and 3,518,260.

Various cephalosporins, including cephalosporin C on occasion but not cephaloglycin, have been reacted with nucleophilic, aromatic mercaptans to produce compounds having the structure

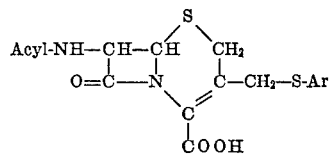

In U.S. Pat. 3,278,531 Ar is phenyl or certain substituted phenyls or certain aromatic heterocyclic rings named, for example, in column 5. Similar nucleophiles, e.g. 2-mercaptopyrimidines, are disclosed in U.S. 3,261,832 and Great Britain 1,101,422 and U.S. 3,479,350 and U.S. 3,502,665, all issued to Glaxo. A parallel disclosure is found in Great Britain 1,109,525 to Ciba, e.g. in definition "h" for $R_3$. Additional nucleophiles of this type were disclosed by Fujisawa in Belgium 714,518 (Farmdoc 35,307; Netherlands 68/06129 and South Africa 2,695/68), in Canada 818,501 (Farmdoc 38,845), in Great Britain 1,187,323 (Farmdoc 31,936; Netherlands 67/14888) and especially in U.S. 3,516,997 (Farmdoc 34,-328; Netherlands 68/05179) which includes the compound named cefazolin, which has a tetrazolylacetyl sidechain on the 7-amino group and a 5-methyl-thiadiazolyl-thiomethyl group at the 3-position and is described at some length in the scientific literature, e.g. in Antimicrobial Agents and Chemotherapy—1969, American Society for Microbiology, Bethesda, Md. at pages 236–243 and in J. Antibiotics (Japan) 23 (3), 131–148 (1970).

More recently, replacement of the 3-acetoxy group of a cephalosporin by various heterocyclic thiols has been disclosed in U.S. 3,563,983 and in Netherlands 70/05519 (Farmdoc 80,188R) where the sidechains were, for example, 7 - α - aminophenylacetamido and typical heterocyclic thiols were 2-methyl - 1,3,4 - thiadiazole - 5 - thiol and 1-methyl - 1,2,3,4 - tetrazole - 5 - thiol; the latter corresponds to U.S. Pat. 3,641,021 issued Feb. 8, 1972 on an application filed Apr. 18, 1969.

Various cephalosporins having the structure

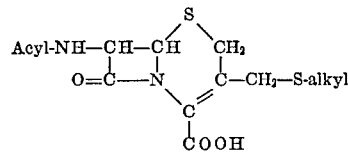

in which acyl represents various sidechains including α-aminophenylacetyl have been described in some of the above and by Glaxo in Belgium 734,532 (Farmdoc 41,-619) and in Belgium 734,533 (Farmdoc 41,620).

Cephalosporins having the structure

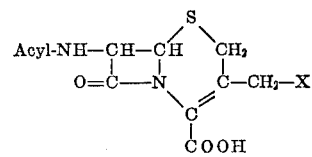

where X includes

and

are disclosed in some of the above and in U.S. 3,239,515, 3,239,516, 3,243,435, 3,258,461, 3,431,259 and 3,446,803.

Related publications in the scientific literature include J. Med. Chem. 8, 174–181 (1965), and J. Chem. Soc. (London) 1595–1605 (1965), 5051–5031 (1965) and 1959–1963 (1967).

SUMMARY OF THE INVENTION

This invention comprises the amphoteric compound of the formula

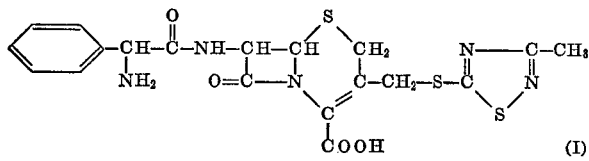

having the D configuration and existing primarily as the zwitterion, and its nontoxic pharmaceutically acceptable salts.

Such salts include the nontoxic carboxylic acid salts thereof, including nontoxic metallic salts such as sodium, potassium, calcium and aluminum, the ammonium salt and substituted ammonium salts, e.g. salts of such nontoxic amines as trialkylamines, including triethylamine, procaine, dibenzylamine, N-benzyl-beta-phenethylamine, 1-ephenamine, N,N'-dibenzylethylenediamine, dehydroabietylamine, N,N'-bis-dehydroabietylethylenediamine, N-(lower)-alkylpiperidine, e.g., N-ethylpiperidine, and other amines which have been used to form salts with benzylpenicillin; and the nontoxic acid addition salts thereof (i.e., the amine salts) including the mineral acid addition salts such as the hydrochloride, hydrobromide, hydroiodide, sulfate, sulfamate and phosphate and the organic acid addition salts such as the maleate, acetate, citrate, oxalate, succinate benzoate, tartrate, fumarate, malate, mandelate, ascorbate and the like.

The amphoteric compound of the present invention is prepared according to the present invention by coupling with 7 - amino-3-(3-methyl-1,2,4-thiadiazol-5-ylthiomethyl)-3-cephem-4-carboxylic acid (II) (or a salt or easily hydrolyzed ester thereof including those of U.S. Pat. 3,284,451 and any of the silyl esters described in U.S. Pat. 3,249,622 for use with 7-aminopenicillanic acid and used in Great Britain 1,073,530) a particular acid or its functional equivalent as an acylating agent for a primary amino group. After coupling, the blocking group is removed to give the desired product. Said acid has the formula

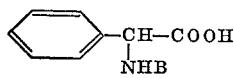

wherein B represents a blocking group of the type used either in peptide syntheses or in any of the numerous synthesis of α-aminobenzylpenicillin from 2-phenylglycine. Particularly valuable blocking groups are a proton, as in the compound of the formula

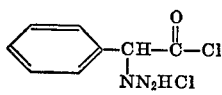

or a β-diketone as in Great Britain 1,123,333, e.g., methyl acetoacetate, in which case the acid containing the blocked amino group is preferably converted to a mixed anhydride, as with ethyl chloroformate, before reaction with Compound II or a salt thereof to form the desired product I after acid cleavage.

Further to the discussion above of blocking groups used on the free amino group of the sidechain acid during its coupling with Compound II, the blocking group is then removed to form the products of the present invention, e.g., the t-butoxy-carbonyl group is removed by treatment with formic acid, the carbobenzyloxy group is removed by catalytic hydrogenation, the 2-hydroxy-1-naphthcarbonyl group is removed by acid hydrolysis and the trichloroethoxycarbonyl group by treatment with zinc dust in glacial acetic acid. Obviously other functionally equivalent blocking groups for an amino group can be used and such groups are considered within the scope of this invention.

Thus, with respect to said acid to be used to couple with Compound II, functional equivalents include the corresponding acid anhydrides, including mixed anhydrides and particularly the mixed anhydrides prepared from stronger acid such as the lower aliphatic monoesters of carbonic acid, or alkyl and aryl sulfonic acids and of more hindered acids such as diphenylacetic acid. In addition, an acid azide or an active ester or thioester (e.g., with p-nitrophenol, 2,4-dinitrophenol, thiophenol, thioacetic acid) may be used or the free acid itself may be coupled with Compound II after first reacting said free acid with N,N'-dimethylchloroforminium chloride [cf. Great Britain 1,008,170 and Novak and Weichet, Experientia XXI, 6,360 (1965)], or by the use of enzymes or of an N,N'-carbonyldiimidazole or an N,N'-carbonylditriazole [cf. South African patent specification 63/2,684] or a carbodiimide reagent [especially N,N'-dicyclohexylcarbodiimide, N,N'-diisopropylcarbodiimide or N-cyclohexyl-N'-(2-morpholinoethyl)carbodiimide; cf. Sheehan and Hess, J. Amer. Chem. Soc., 77, 1067 (1955)], or of alkylylamine reagent [cf. R. Buijle and H. G. Viehe, Angew. Chem. International Edition 3, 582 (1964)], or of a ketenimine reagent [cf. C. L. Stevens and M. E. Mond, J. Amer. Chem. Soc., 80, (4065)], or of an isoxazolium salt reagent [cf. R. B. Woodwar, R. A. Olofson and H. Mayer, J. Amer. Chem. Soc., 83, 1010 (1961)]. Another equivalent of the acid chloride is a corresponding azolide, i.e., an amide of the corresponding acid whose amide nitrogen is a member of an quasiaromatic five-membered ring containing at least two nitrogen atoms, i.e., imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield dimidazolide. The by-product, imidazole, precipitates and may be separated and the imidazolide isolated, but this is not essential. The methods for carrying out these reactions to produce a cephalosporin and the methodss used to isolate the cephalosporin so produced are well known in the art.

In the treatment of bacterial infections in man, the compounds of this invention are administered orally or parenterally, in accordance with conventional procedures for antibiotic administration, in an amount of from about 5 to 200 mg./kg./day and preferably about 5 to 20 mg./kg./day in divided dosage, e.g., three to four times a day. They are administered in dosage units containing, for example, 125 or 250 or 500 mg. of active ingredient with suitable physiologically acceptable carriers or excipients. The dosage units are in the form of liquid preparations such as solutions or suspensions or as solids in tablets or capsules.

Exactly 200 g. of 7-aminocephalosporanic acid (7-ACA) was suspended in 500 ml. of acetone and a solution of 240 g. of p-toluenesulfonic acid in 500 ml. of acetone was added in one charge. After stirring for five minutes, at room temperature, the mixture was filtered through diatomaceous earth ("Super Cel") and the bed washed with 150 ml. of acetone (the insoluble matter weighed about 30 g.). Then 80 ml. of water was added to the filtrate and, while stirring, the p-toluene-sulfonate salt crystallized out after scratching on the inside of the flask with a glass rod. The suspension was stirred in an ice-salt bath for thirty minutes and filtered cold. It was washed with 2× 200 ml. of cold acetone (0° C.) and air dried; yield 250 g. of salt. This p-toluene-sulfonate salt of 7–ACA was stirred in 2 liters of methanol and the insoluble matter filtered through "Super Cel." The filtrate was placed in a five liter 3 neck flask and 2 liters of water were added. Then the pH was adjusted to 4 by the addition of concentrated ammonium hydroxide with cooling and the suspension stirred for one hour at 0° C. The product was collected by filtration and washed with 2× 100 ml. $H_2O$ (0° C.) and 3× 1 liter acetone (room temperature). After air drying, the yield of 7–ACA was 145 g.

Reference: Glaxo, British Patent 1,104,938 (1968).

The following examples are given in illustration of, but not in limitation of, the present invention. All temperatures are in degrees centigrade. 7-aminocephalosporanic acid is abbreviated as 7–ACA and methyl isobutyl ketone as MIBK. "Skellysolve B" is a petroleum ether fraction of B.P. 60–68° C. consisting essentially of n-hexane.

DESCRIPTION OF THE PREFERRED EMBODIMENTS

Example 1

Sodium D - α - [1-carbomethoxypropen-2-yl)-amino]-phenylacetate.—Lit. ref. E. Dane, F. Oreis, P. Konrad, T. Dockner, Angew. Chem. Intern. Ed. Engl. 1, 658 (1962); E. Dane and T. Dockner Angew. Chem. 76, 342 (1964); Spencer, Flynn, Roeske, Sin and Chauvette, J. Med. Chem., 9, 746–50 (1966); U.S. Pat. 3,496,171 (Lilly).

To a well stirred mixture of 40 g. (1 mole) of NaOH in 40 ml. of $H_2O$ and one liter of benzene was added 151.6 g. (1 mole) of D-(—)-phenylglycine. The mixture was held at about 55° C. for 30 minutes and then with vigorous stirring 116 g. (1 mole) of methyl acetoacetate was added and the mixture stirred and heated at reflux until no more water was collected in the Dean-Stark trap. Next one liter of acetone was added with the heat removed and then the slurry was cooled and stirred 30 minutes in an ice-salt bath. The product was collected by filtration, washed well with copious amounts of acetone and air dried. Yield was 191 g., dec. pt. 252° C., $[\alpha]_D^{22°}$ C. +207° (C=1% $H_2O$).

5-mercapto-3-methyl-1,2,4-thiadiazole.—Lit. ref. Geordeler et al., Chem. Ber., 90, 182–87 (1957).

Sixteen grams (.17 mole) of acetamidine hydrochloride was suspended in 165 ml. methylene chloride followed by 27 g. (.15 mole) of perchloromethylmercaptan. The solution was cooled to —8° C. using a Dry Ice-acetone bath and 34 g. (.85 mole) of NaOH in 50 ml. of water was added dropwise, keeping the temperature between —10° and —8° C. At the end of the addition the solution was filtered and the organic phase was separated from the water. The water layer was extracted with 3× 10 ml. of methylene chloride and the combined methylene chloride solutions were washed with water until at neutrality. The methylene chloride solution was dried over sodium sulfate and removed under vacuum. The product, 5-chloro-3-methyl-1,2,3-thiadiazole remains as an oil. Yield 12 g. This oil was distilled at 38° C. and 10 mm. Hg to yield 10 g. as a colorless oil.

Ten grams (0.75 mole) of 5-chloro-3-methyl-1,2,4-thiadiazole was dissolved in 16 ml. of 100% ethanol followed by 6 g. (0.8 mole) thiourea and heated on a steam bath for one and a half hours. This solution was then added to 4 g. (.1 mole) of NaOH in 100 ml. $H_2O$ and boiled for five minutes. After cooling the solution was filtered and the filtrate acidified to pH 2 by addition of 6 N HCl. It was extracted with 4× 100 ml. ethyl ether and, after drying the ether over sodium sulfate, the solution was evaporated to dryness under vacuum and the resulting solid 5-mercapto - 3-methyl-1,2,4-thiadiazole recrystallized from $H_2O$. Yield 3 g., M.P. 147–148° C.

*Analysis.*—Calcd. for $C_3H_4N_2S_2$ (percent): C, 27.25; H, 3.05; N, 21.20; S, 48.50. Found (percent): C, 27.60; H, 3.40; N, 21.28; S, 46.78.

7-amino-3-(3-methyl-1,2,4-thiadiazol-5-yl thiomethyl)-3-cephem-4-carboxylic acid. (II).—7.5 g. (0.027 mole) of 7–ACA was dissolved in 150 ml. of 0.1 M phosphate buffer of pH 6.4 followed by 4.5 g. (0.027 mole) of $NaHCO_3$. Then 3.9 g. (0.03 mole) of 5-mercapto-3-methyl-1,2,4-thiadiazole was added and with moderate stirring the solution was heated to 60° C. At 60° C. the pH was readjusted to pH 6.4 by addition of $NaHCO_3$. The solution was kept at 60° C. for four hours. At the end of the heating period, the product crystallized out and after cooling the solution at 0° C. in an ice bath for one hour it was collected by filtration, washed with cold water and air dried. Seven grams was obtained, M.P. 200° C. (dec.).

*Analysis.*—Calcd. for $C_{11}H_{12}N_4O_3S_3$ (percent): C, 38.35; H, 3.51; N, 16.27. Found (percent): C, 37.92; H, 3.71; N, 15.86.

7 - [D - (α-amino-α-phenylacetamido)]-3-(3-methyl-1,2,4 - thiadiazol - 5-ylthiomethyl)-3-cephem-4-carboxylic acid. (I).—To a stirred suspension of 6.25 g. (0.023 mole) of sodium D - (α[1 - carbomethoxypropen-2-yl)-amino]-phenylacetate in 70 ml. of acetonitrile and two drops of N,N'-dimethylbenzylamine at —10° C. was added 3 g. (0.027 mole) of ethyl chloroformate and stirring continued for 10 minutes at —10° C. Next, a solution of 7.9 g. (0.023 mole) of 7-amino-3-(3-methyl-1,2,4-thiadiazol - 5-yl-thiomethyl)-3-cephem-4-carboxylic acid in 30 ml. of acetonitrile and 3.4 ml. (0.024 mole) of triethylamine precooled at 0° C. was added all at once and stirring was continued 30 minutes at 0° C. Finally salt (NaCl) was added in excess to saturate the solution. This took 15 minutes. The organic layer (top) was separated and to it was added 25 ml. of $H_2O$ and, under reduced pressure, the solution was concentrated to a volume of about 35 ml. Next, a solution of MIBK (75 ml.) and formic acid (9 ml.) was added and the mixture stirred for 30 minutes at 0° C. Eight grams of a semi-solid were then filtered off and then stirred with acetonitrile (30 ml.) until a filterable solid formed. This was collected by filtration, washed with acetonitrile and air dried. Yield 7 g. This material was ground up fine and suspended in 100 ml. of water and to it was added 10 ml. of 40% $H_3PO_4$ and after 15 minutes the insolubles were filtered off and the filtrate stirred 10 minutes with two grams of "Darko KB" carbon and filtered again. The filtrate's pH was adjusted to 3.5 with $NaHCO_3$. The product began to crystallize and after cooling one hour at 0° C., the material was collected by filtration, washed with cold water (20 ml.) and then large amounts of acetone and air dried. After drying twelve hours over $P_2O_5$ (vacuum) there was obtained 1.75 g., dec. about 160° C. The air was consistent with the desired structure.

*Analysis.*— Calcd. for $C_{19}H_{19}N_5O_4S_3 \cdot 2H_2O$ (percent): C, 44.36; H, 4.51; N, 13.62. Found (percent): C, 44.57; H, 4.75; N, 13.22.

7-[D-(α-amino-α-phenylacetamido)] - 3 - (3 - methyl-1,2,4-thiadiazol-5-ylthio)methyl-3-cephem - 4 - carboxylic acid (called New Compound) after solution in dimethyl sulfoxide (DMSO) followed by dilution with Nutrient Broth was found to exhibit the following Minimum Inhibitory Concentrations (M.I.C.) in mcg./ml. versus the indicated microorganisms as determined by overnight incubation at 37° C. by Tube Dilution. Results with four old compounds are also given.

TABLE 1
[MIC in mcg./ml.]

| Organism | | New compound | Cepha-lexin | Cephalo-glycin | Cepha-lothin | Cephalo-ridine |
|---|---|---|---|---|---|---|
| D. pneumoniae plus 5% serum* | A9585 | 0.4 | 1.3 | 0.3 | 0.08 | 0.008 |
| Str. pyogenes plus 5% serum* | A9604 | 0.16 | 0.3 | 0.16 | 0.08 | 0.008 |
| S. aureus Smith | A9537 | 0.3 | 1.3 | 1.3 | 0.08 | 0.03 |
| S. aureus Smith plus 50% serum | A9537 | 8 | 2.5 | 2.5 | 0.3 | 0.03 |
| S. aureus BX1633-2 at 10⁻³ dilution | A9606 | 1.3 | 4 | 0.6 | 0.3 | 0.3 |
| S. aureus BX1633-2 at 10⁻² dilution | A9606 | | 8 | | 0.6 | 10 |
| S. aureus meth.-resistant | A15097 | 2 | 32 | 2 | 1.3 | 0.6 |
| Sal. enteritidis | A9531 | 0.3 | 4 | 0.3 | 0.3 | 0.6 |
| E. coli Juhl | A15119 | 8 | 8 | 1 | 4 | 1 |
| E. coli | A9675 | 8 | 16 | 4 | 16 | 1 |
| K. pneumoniae | A9977 | 2 | 4 | 0.6 | 1 | 1.3 |
| K. pneumoniae | A15130 | 8 | 8 | 1 | 8 | 2 |
| Pr. mirabilis | A9900 | 2 | 4 | 0.6 | 1 | 2.5 |
| Pr. morganii | A15153 | 4 | >125 | 16 | >250 | 250 |
| P. aeruginosa | A9843A | 250 | >125 | 250 | >250 | >250 |
| Ser. marcescens | A20019 | 250 | >125 | 250 | >250 | 250 |

*50% nutrient broth plus 45% antibiotic assay broth.

Blood levels in the mouse after oral administration were determined with the following results:

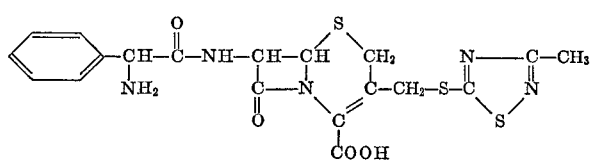

| R= | Dose, mgm./kg. | Blood level in mcg./ml. hours after administration of dose— | | | |
|---|---|---|---|---|---|
| | | 0.5 hrs | 1 hr. | 2 hrs. | 3.5 hrs |
| $-S-C\underset{S}{\overset{N-C-CH_3}{\underset{\|}{\|}}}N$ | 100 | 33.5 | | | |
| | 55 | 28 | | | |
| | 50 | 20.3 | | | |
| | 20 | 13.4 | | | |
| | 20 | 16.54 | 14.06 | 8.18 | 3.56 |
| H (cephalexin) | 100 | 44.5 | 13.5 | 3.4 | 0.79 |
| | 50 | 21.5 | | | |
| | 20 | 8.79 | 3.51 | 0.58 | <0.16 |
| | 20 | 1.1 | 1.0 | 0.42 | 0.19 |
| $-O-\overset{O}{\underset{\|}{C}}-CH_3$ (cephaloglycin) | | | | | |

Example 2

Sodium 7-[D-(α-amino-α-phenylacetamido)] - 3 - (3-methyl-1,2,4-thiadiazol-5-ylthiomethyl) - 3 - cephem-4-carboxylate.—To a stirred aqueous suspension of the zwitterionic form of 7 - [D - (α-amino - α - phenylacetamido)]-3-(3-methyl-1,2,4-thiadiazol - 5 - ylthiomethyl)-3-cephem-4-carboxylic acid (0.8 mmole) is added 1 N aqueous sodium hydroxide at room temperature until a clear solution (pH 10.8) is obtained. This solution is immediately freeze-dried to give impure, solid sodium 7-[D-(α-amino-α-phenylacetamido)]-3-(3-methyl - 1,2,4 - thiadiazol-5-ylthiomethyl)-3-cephem-4-carboxylate.

I claim:

1. The compound having the D configuration in the sidechain of the formula or a nontoxic, pharmaceutically acceptable salt thereof.

2. The compound having the D configuration in the sidechain of the formula

3. The sodium salt of the compound of claim 2.
4. The potassium salt of the compound of claim 2.
5. The hydrochloride of the compound of claim 2.
6. The zwitterion form of the compound of claim 2.
7. A nontoxic, pharmaceutically acceptable acid addition salt of the compound of claim 2.

References Cited
UNITED STATES PATENTS

| | | | |
|---|---|---|---|
| 3,641,021 | 2/1972 | Ryan | 260—243 C |
| 3,516,997 | 6/1970 | Takano et al. | 260—243 C |
| 3,243,435 | 3/1966 | Cowley et al. | 260—243 C |
| 3,365,449 | 1/1968 | Takano et al. | 260—243 C |
| 3,497,505 | 1/1970 | Pfeiffer et al. | 260—243 C |
| 3,530,123 | 9/1970 | Takano et al. | 260—243 C |

NICHOLAS S. RIZZO, Primary Examiner

U.S. Cl. X.R.

424—246